United States Patent
Sassine et al.

(10) Patent No.: US 7,130,157 B2
(45) Date of Patent: Oct. 31, 2006

(54) HEAD SUSPENSION HAVING A DISPLACEMENT LIMITER

(75) Inventors: Joseph H. Sassine, Lakeville, MN (US); James Roger Mahoney, Stewart, MN (US); Kevin J. Schulz, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 439 days.

(21) Appl. No.: 10/640,165

(22) Filed: Aug. 13, 2003

(65) Prior Publication Data

US 2004/0032695 A1   Feb. 19, 2004

Related U.S. Application Data

(60) Provisional application No. 60/403,386, filed on Aug. 14, 2002.

(51) Int. Cl.
G11B 5/48 (2006.01)

(52) U.S. Cl. .............................. 360/245.7; 360/245.9; 360/245.4

(58) Field of Classification Search ............ 360/245.7, 360/245.9, 245.3, 244.3, 245.4
See application file for complete search history.

(56) References Cited

U.S. PATENT DOCUMENTS

| | | | | |
|---|---|---|---|---|
| 5,055,969 A | 10/1991 | Putnam | ...................... | 361/398 |
| 5,333,085 A | 7/1994 | Prentice et al. | ............. | 360/104 |
| 5,598,307 A | 1/1997 | Bennin | ........................ | 360/104 |
| 5,645,735 A | 7/1997 | Bennin et al. | ................ | 216/22 |
| 5,771,136 A | 6/1998 | Girard | ........................ | 360/104 |
| 5,796,556 A | 8/1998 | Boutaghou | .................. | 360/104 |
| 5,815,349 A | 9/1998 | Frater | .......................... | 360/104 |
| 5,870,258 A | 2/1999 | Khan et al. | .................. | 360/104 |
| 5,877,920 A | 3/1999 | Resh | ........................... | 360/104 |
| 5,883,759 A | 3/1999 | Schulz | ........................ | 360/104 |
| 5,929,326 A | 7/1999 | Imaino et al. | ................. | 73/105 |
| 5,930,079 A | 7/1999 | Vera et al. | .................... | 360/104 |
| 5,955,176 A | 9/1999 | Erpelding et al. | .......... | 428/209 |
| 5,987,733 A | 11/1999 | Goss | ........................ | 29/603.03 |
| 6,021,022 A | 2/2000 | Himes et al. | ................ | 360/104 |
| 6,046,883 A | 4/2000 | Miller | ........................ | 360/104 |
| 6,055,132 A | 4/2000 | Arya et al. | .................. | 360/104 |
| 6,057,985 A | 5/2000 | Kazama | ...................... | 360/104 |
| 6,067,209 A | 5/2000 | Aoyagi et al. | ............. | 360/105 |
| 6,088,201 A | 7/2000 | Kazama | ................... | 360/244.2 |
| 6,172,853 B1 | 1/2001 | Davis et al. | ............. | 360/245.7 |
| 6,191,915 B1 | 2/2001 | Takagi et al. | ............... | 360/104 |
| 6,222,704 B1 | 4/2001 | Aoyagi et al. | ........... | 360/244.9 |
| 6,233,121 B1 * | 5/2001 | Pan | .......................... | 360/245.7 |

(Continued)

FOREIGN PATENT DOCUMENTS

JP     2002133810 A  *  5/2002

Primary Examiner—William J Klimowicz
(74) Attorney, Agent, or Firm—Westman, Champlin & Kelly

(57) ABSTRACT

A suspension including a load beam, a flex gimbal, and a displacement limiter. The load beam includes a distal end having a dimple extending downwardly therefrom and an aperture. The flex gimbal includes a base dielectric layer and a plurality of electrical conductors coupled to the dielectric layer. The dielectric layer includes a top side that is attached to a bottom side load beam at a first location. The displacement limiter is attached to the dielectric layer and includes a limiter member having a first portion extending through the aperture of the load beam and a second portion extending over a top surface of the load beam. Displacement of the flex gimbal relative to the load beam is limited by the second limiter portion.

34 Claims, 9 Drawing Sheets

U.S. PATENT DOCUMENTS

| | | | |
|---|---|---|---|
| 6,243,235 B1 | 6/2001 | Fu et al. | 360/245.7 |
| 6,266,214 B1 | 7/2001 | Khan | 360/245.9 |
| 6,282,064 B1 | 8/2001 | Palmer et al. | 360/245.9 |
| 6,313,972 B1 | 11/2001 | Williams et al. | 360/245.3 |
| 6,320,729 B1 | 11/2001 | Coon | 360/245.7 |
| 6,366,431 B1 | 4/2002 | Tsuchiya et al. | 360/245 |
| 6,381,100 B1 | 4/2002 | Bennin et al. | 360/245.9 |
| 6,388,843 B1 | 5/2002 | Takagi et al. | 360/245.7 |
| 6,392,843 B1 | 5/2002 | Murphy | 360/245.3 |
| 6,424,498 B1 | 7/2002 | Patterson et al. | 360/245.7 |
| 6,445,546 B1 | 9/2002 | Coon | 360/245.7 |
| 6,480,359 B1 | 11/2002 | Dunn et al. | 360/245.9 |
| 6,535,355 B1 | 3/2003 | Boutaghou et al. | 360/245.7 |
| 6,539,609 B1 | 4/2003 | Palmer et al. | 29/603.03 |
| 6,549,375 B1 | 4/2003 | Crane et al. | 360/245.3 |
| 6,556,384 B1 | 4/2003 | Inoue et al. | 360/245.7 |
| 6,714,384 B1 * | 3/2004 | Himes et al. | 360/245.9 |
| 6,747,849 B1 * | 6/2004 | Le et al. | 360/245.7 |
| 6,791,798 B1 * | 9/2004 | Mei | 360/245.7 |
| 2001/0039716 A1 * | 11/2001 | Palmer et al. | 29/603.04 |
| 2002/0051323 A1 | 5/2002 | Rancour et al. | 360/245.3 |
| 2003/0039075 A1 | 2/2003 | Rao et al. | 360/245.3 |
| 2003/0053258 A1 | 3/2003 | Dunn et al. | 360/245.9 |

* cited by examiner

HEAD SUSPENSION HAVING A DISPLACEMENT LIMITER

CROSS-REFERENCE TO RELATED APPLICATION

This application claims the benefit of U.S. Provisional Application No. 60/403,386 filed on Aug. 14, 2002 for inventors Joseph H. Sassine, James Roger Mahoney and Kevin J. Schulz and entitled Limiter for Flex Gimbal Suspension Design.

FIELD OF THE INVENTION

The present invention relates to a head suspension for use in the disc drive, and, more particularly but not by limitation to a head suspension that includes a flex gimbal and a displacement limiter that limits displacement of the flex gimbal relative to a load beam.

BACKGROUND OF THE INVENTION

Disc drives are the primary devices employed for mass storage of computer programs and data used in computer systems. Contemporary disc drives use rigid discs, which are coated with a magnetizable medium for storage of digital information in a plurality of circular, concentric data tracks. The discs are mounted on a spindle motor, which causes the discs to spin and the surfaces of the discs to pass under respective bearing disc head sliders. The sliders carry transducers, which write information to and read information from the disc surfaces. The combination of the slider and the read/write transducer is also known as a read/write head (hereinafter "head"). An actuator mechanism moves the heads from track-to-track across the surfaces of the discs under control of electronic circuitry. The actuator mechanism includes track accessing arms and suspensions for supporting the heads.

Head suspensions typically include a load beam, a gimbal that supports the head, and a flex circuit providing an electrical connection to the read/write transducer of the head. The gimbal is typically an etched gimbal ring that is welded to the load beam. The flex circuit is generally routed over or adjacent to the gimbal and the head. During operation, the load beam applies a downwardly directed load force to the head at a load point. As the disc rotates, air is dragged and compressed under bearing surfaces of the head creating a hydrodynamic lifting force that counteracts the load force and causes the head to lift and fly on an air bearing in close proximity to the disc surface. The gimbal includes flexure features that allow the head to pitch and roll over the load point while following the topography of the disc. The air bearing maintains spacing between the transducer and the disc surface, which reduces transducer efficiency. However, the avoidance of direct contact with the disc surface vastly improves the reliability and useful life of the head and disc components.

The disc drive industry has been progressively decreasing the size and mass of the slider structures in order to reduce the moving mass of the actuator assembly and to permit closer operation of the transducer to the disc surface. The former giving rise to faster data access and the latter giving rise to improved transducer efficiency that can be traded for higher data storage capacity. The size (and mass) of a slider is usually characterized with reference to a so-called standard 100% slider, known as a mini-slider. The term 70%, 50% and 30% slider are respectively known as a micro-slider, a nano-slider, and a pico slider, which are more recent low mass sliders that have linear dimensions that are scaled by the applicable percentage relative to the linear dimensions of a standard mini-slider.

Although smaller, low mass heads can provide both performance and economic advantages, the reductions in physical slider dimensions give rise to numerous problems that do not necessarily scale linearly with the dimensional changes. If, for example, the size and load force on the slider was simply halved, the air bearing stiffness in the pitch direction will be reduced on the order of one-eighth. Accordingly, the flexure features of the gimbal must have sufficient compliance to allow the slider adequate freedom to pitch and roll in order to maintain the trailing edge of the slider where the transducer is located at the desired distance from the rotating disc surface. Failure to do so, can lead to signal modulation, data loss, or even catastrophic failure of the head or disc components. Accordingly, suspensions designed for use with pico-sliders must include gimbals having highly compliant flexure features.

The conventional steel gimbal described above is generally too stiff to provide the desired compliance for operation with pico sliders. Gimbals having highly compliant flexure features are being developed. Unfortunately, such highly compliant gimbals and the heads they support become more susceptible to damage caused by large vertical displacement in response to a shock event.

Shock events can occur due to forces applied during assembly, fly testing, shipping, and handling of the suspension, or during use of the disc drive. For example, a transportation shock may generate displacement forces large enough to cause the delicate flexure features of the gimbal to bend past their yield point, which may result in a separation between the load beam and the head at the load point. Also, certain disc drives have a ramp which lifts the load beam to unload the slider from the disc surface during start and stop of disc rotation. If the slider is a self-loading slider, sub-ambient pressure developed between the slider and the disc surface can cause a large vertical displacement of the gimbal as the slider is lifted from the disc surface. Additionally, shock events that occur while the suspension is supported by the ramp, can also cause potentially damaging displacement of the head relative to the load beam.

Embodiments of the present invention provide solutions to these and other problems, and offer other advantages over the prior art.

SUMMARY OF THE INVENTION

The present invention is directed to a suspension having a highly compliant gimbal and displacement limiting elements to prevent damage to the suspension in response to a shock event. The suspension includes a load beam, a flex gimbal, and a displacement limiter. The load beam includes a distal end having a dimple extending downwardly therefrom and an aperture. The flex gimbal includes a base dielectric layer and a plurality of electrical conductors coupled to the dielectric layer. The dielectric layer includes a top side that is attached to a bottom side of the load beam at a first location. The displacement limiter is attached to the dielectric layer and includes a limiter member having a first portion extending through the aperture of the load beam and a second portion extending over a top surface of the load beam. Displacement of the flex gimbal relative to the load beam is limited by the second limiter portion.

Another aspect of the invention is directed to a method of manufacturing the above-described suspension. In the method, a load beam, a flex gimbal, and a displacement limiter are provided. Next, a top side of the dielectric layer is attached to a bottom side load beam and to a bottom side of the displacement limiter. A first portion of the displacement limiter is then extended through the aperture of the load beam and a second portion of the displacement limiter is positioned over a top surface of the load beam.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
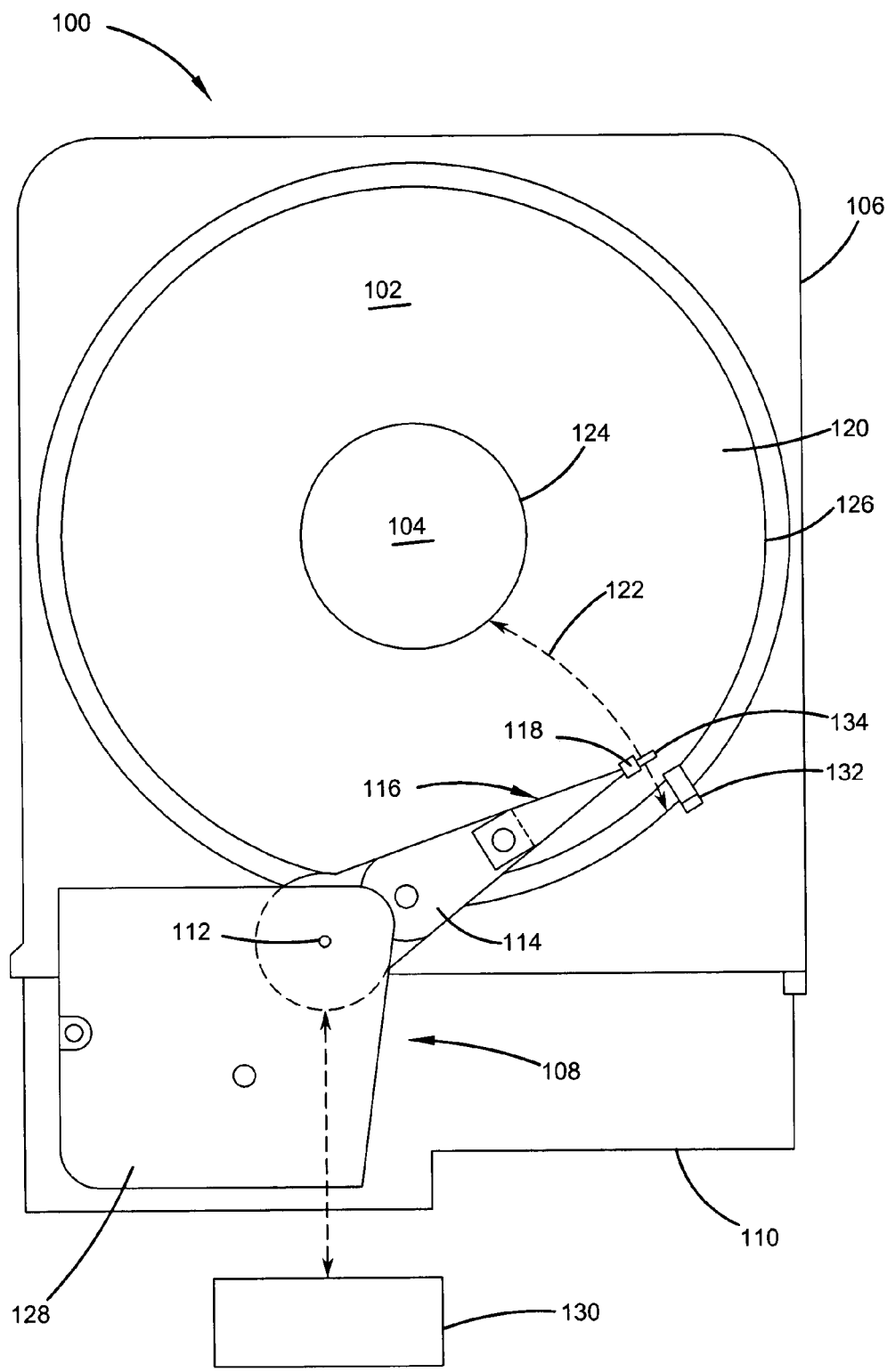
FIG. 1 is a top plan view of a disc drive.

FIG. 1 is a top plan view of an example of a disc drive 100 in which embodiments of the present invention are useful. Disc drive 100 includes a magnetic disc 102 mounted for rotational movement about an axis 104 and driven by a spindle motor (not shown). The components of disc drive 100 are contained within a housing that includes base 106 and a cover (not shown). Disc drive 100 also includes an actuator mechanism 108 mounted to a base plate 110 and pivotally moveable relative to disc 102 about axis 112. Alternatively, actuator mechanism 108 can be a linear actuator.

A head gimbal assembly (HGA) or suspension of the present invention, shown schematically at 116, is attached to actuator arm 114 of actuator mechanism 108, and includes a read/write or recording head 118. Head 118 includes a slider and at least one transducing element for reading information from, and writing information to, disc 102.

Actuator mechanism 108 is adapted to rotate suspension 116 and head 118 along arcuate path 122 between an inner diameter 124 and an outer diameter 126 of disc 102. A cover 128 can cover a portion of actuator mechanism 108.

Drive controller 130 controls actuator mechanism 108 through a suitable connection. Drive controller 130 can be mounted within disc drive 100 or located outside of disc drive 100. During operation, drive controller 130 receives position information indicating a portion of disc 102 to be accessed. Drive controller 130 receives the position information from an operator, from a host computer, or from another suitable controller. Based on the position information, drive controller 130 provides a position signal to actuator mechanism 108. The position signal causes actuator mechanism 108 to pivot about axis 112 and position the transducing element carried by head 118 at the desired location. Once the transducer is appropriately positioned, drive controller 130 then executes a read or write operation.

During operation of disc drive 100, as disc 102 rotates, air (and/or a lubricant) is dragged under bearing surfaces (not shown) of the slider of head 118 in a direction that is approximately parallel to the tangential velocity of disc 102. This creates a hydrodynamic lifting force that counteracts a load force provided by suspension 116 and causes head 118 fly above, and in close proximity to, disc surface 120. Suspension 116 allows head 118 to pitch and roll as it rides on the bearing above surface 120 of disc 102 about a load point through which the load force is applied.

Disc drive 100 can include a ramp 132 or other suitable support mechanism to load head 118 onto, and unload head 118 from, disc surface 120 during power-up and power-down operations. When disc drive 100 is to be powered down, actuator mechanism 108, under the control of drive controller 130, rotates suspension 116 to cause a lift tab 134 to engage ramp 132 at outer diameter 126 prior to decelerating the rotation of disc 102. Ramp 132 is configured to support suspension 116 such that head 118 is held above disc surface 120. Likewise, when disc drive 100 is powered up, disc 102 accelerates to a full operating rotational velocity and drive controller 130 controls actuator mechanism 108 to rotate lift tab 134 of suspension 116 off ramp 132 and position head 118 over disc surface 120.

Figure 2A:
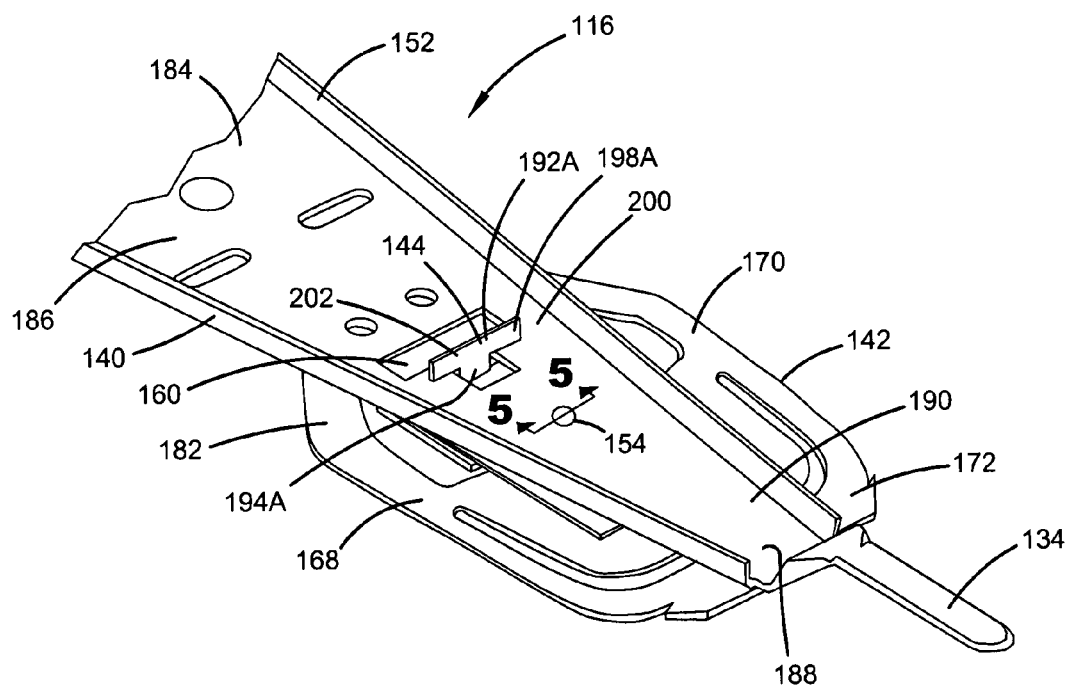
FIGS. 2A and 2B are partial perspective views of a suspension in accordance with embodiments of the invention.
Figure 2B:
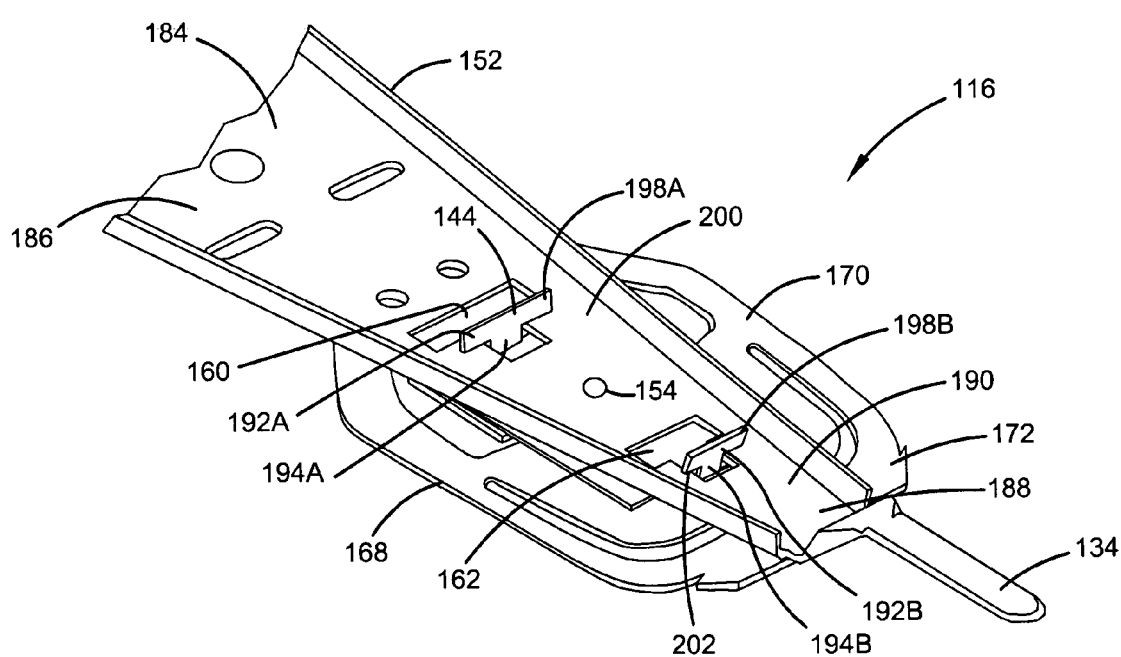
Figure 3A:
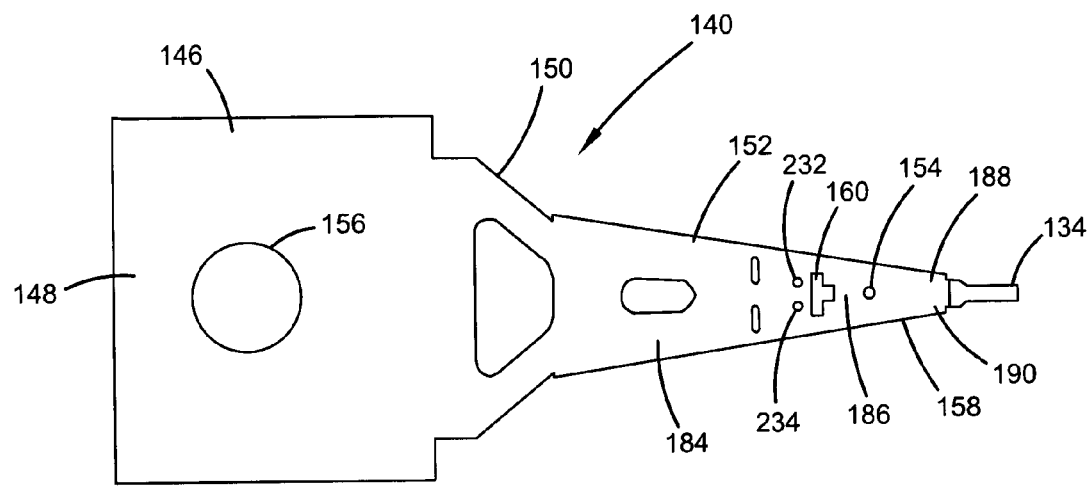
FIGS. 3A and 3B are top plan views of a load beam in accordance with embodiments of the invention.
Figure 3B:
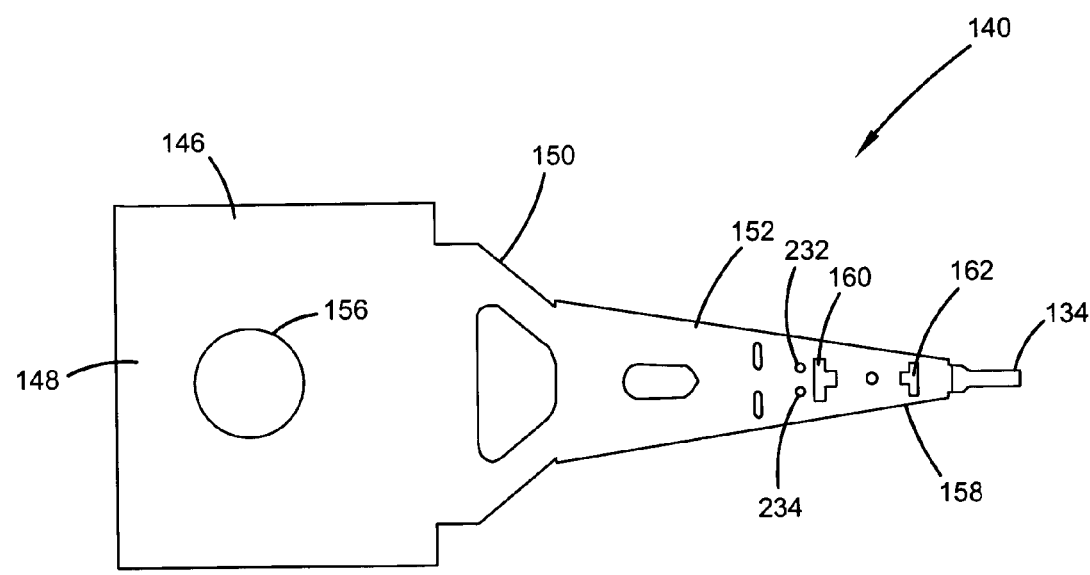

FIGS. 2A and 2B are partial perspective views of a suspension 116 in accordance with embodiments of the invention. Suspension 116 generally includes a load beam 140, a flex gimbal 142 and a displacement limiter 144. Load beam 140 generally includes a mounting portion 146 at a proximal end 148, a flexible beam portion 150, a rigid beam section 152, a load point dimple 154, and a lift tab 134, as shown in the top plan view of FIGS. 3A and 3B. Mounting portion 148 includes a swage hole 156, which mounts to track accessing arm 114 (FIG. 1) through a base plate (not shown). Flexible beam portion 150 applies a load force to head 118 through load point 154. Lift tab 134 is mounted to load beam 140 at a distal end 158. Lift tab is adapted to engage ramp 132 (FIG. 1) when disc drive is in a non-operating state and during load and unload operations. Depending on the configuration of displacement limiter 144, load beam 140 also includes one or more apertures, such as 160 and 162, for receiving elements of displacement limiter 144 as will be discussed in greater detail below.

Conventional suspensions can include a laminated gimbal that includes a support layer (typically steel) an electrically insulating layer, and an electrically conducting layer. Unfortunately, these suspensions are too stiff to provide the desired support for low mass heads. Flex gimbal 142 of suspension 116 of the present invention eliminates the support layer, at least in flexure members of flex gimbal 142, to provide a highly compliant gimbal.

Figure 4:
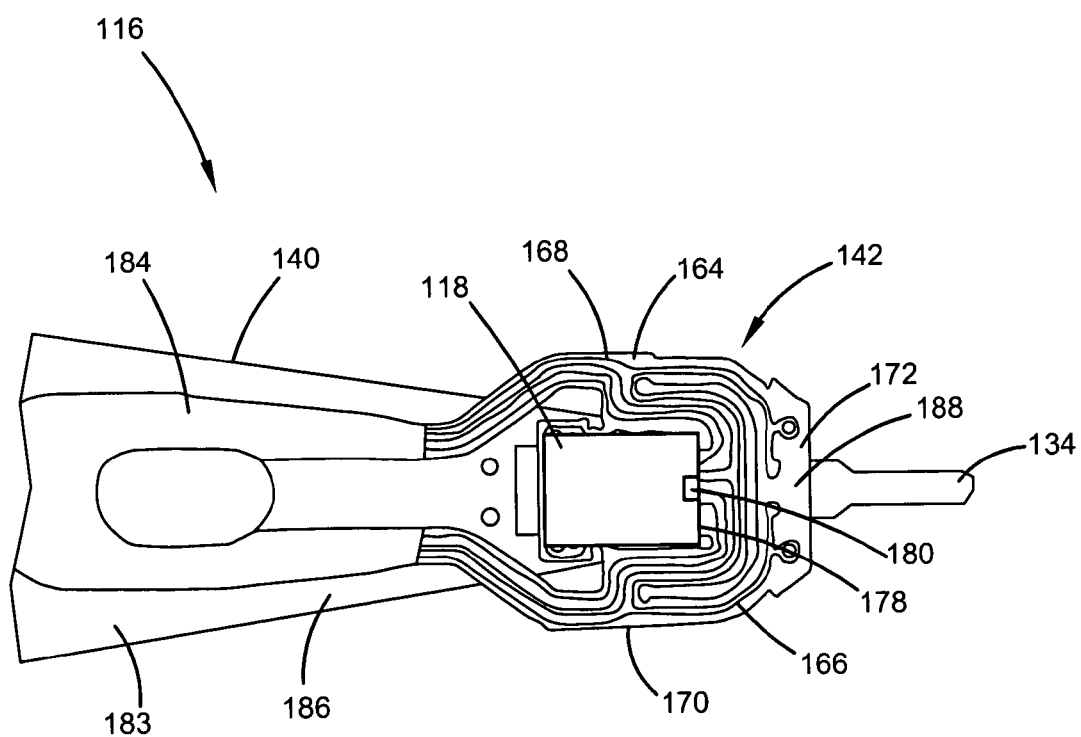
FIG. 4 is a partial bottom plan view of a suspension in accordance with embodiments of the invention.

In accordance with one embodiment of the invention, flex gimbal 142 includes a base dielectric layer 164 and a plurality of electrical conductors 166 coupled to the dielectric layer 164, as shown in the partial bottom plan view of suspension 116 in FIG. 4. Dielectric layer 164 is preferably formed of polyimide or other suitable material. Flex gimbal 142 also includes flexure members in the form of a pair of elongate arms 168 and 170 that extend toward distal end 158 of load beam 140 and alongside dimple 154 to a transverse portion 172. As mentioned above, elongate arms 168 and 170 are preferably formed without a metal support layer and, thus include only the dielectric layer 164 and electrical conductors 166. As a result, elongate arms 168 and 170 are highly compliant thereby allowing suspension 116 to support a low mass head 118 including heads utilizing pico sliders.

Figure 5A:
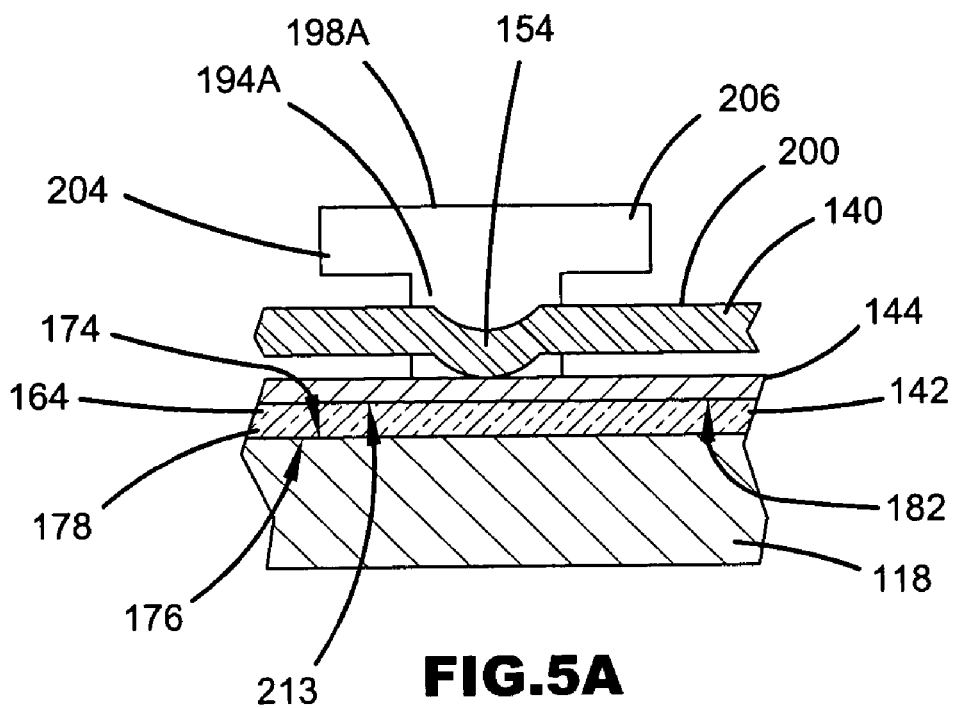
FIGS. 5A and 5B are cross-sectional views of the suspension of FIG. 2A taken generally along line 5—5.
Figure 5B:
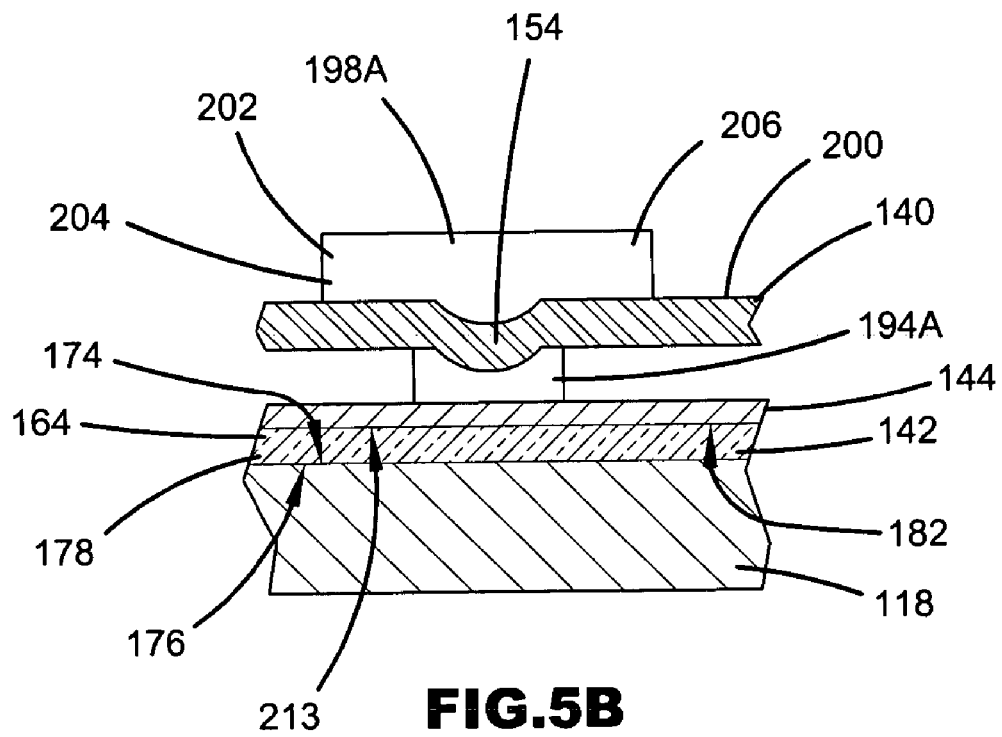

Head 118 includes a top side 174 that is coupled to a bottom side 176 of dielectric layer 164 at a head mount portion 178 that is support by elongate arms 168 and 170, as shown in FIGS. 5A and 5B. Electrical conductors 166 are connected to transducing element 180 of head 118 and provide communication with drive controller 130 (FIG. 1) or other electronics. A top side 182 (FIG. 2A) of dielectric layer 164 mounts to a bottom side 183 of load beam 140 at a first location 184 positioned on a proximate side 186 of dimple 154 using conventional methods, as shown in FIG. 4. Transverse portion 172 joins elongate arms 168 and 170 and, in accordance with one embodiment of the invention, attaches to load beam 140 at a second location 188 that is on a distal side 190 of dimple 154. The connection of flex gimbal 142 at second location 188 provides additional support to the highly compliant elongate arms 168 and 170 to ensure engagement of dimple 154 and flex gimbal 142 during normal operation.

Displacement limiter 144 is configured to limit large downward vertical displacement of head mount portion 178 and head 118 relative to load beam 140. Without displacement limiter 144, head 118 could be vertically displaced a large distance from load beam 140 as a result of a shock event to suspension 116. Such a displacement could damage flex gimbal 142 changing the compliance of elongate arms 168 and 170, which could change the flying characteristics of the slider of head 118 and affect data reading and writing performance. Additionally, large vertical displacements of head 118 can damage the connection of flex gimbal 142 to load beam 140, damage the connection of electrical conductors 166 to transducing element 180 or cause other damage.

Displacement limiter 144 includes at least one limiter member 192. In the embodiment shown in FIG. 2A, displacement limiter 144 includes a first limiter member 192A and, in the embodiment shown in FIG. 2B, displacement limiter 144 includes first and second limiter members 192A and 192B. FIGS. 5A and 5B are cross-sectional views of suspension 116 generally taken along line 5—5 of FIG. 2A during normal operation when head mount portion 178 gimbals about dimple 154, and during a shock load event which causes head 118 to be displaced vertically from load beam 140, respectively. Each limiter member 192A and 192B includes a first portion 194A and 194B, respectively, that extends through a corresponding aperture 160 or 162 of load beam 140. Each displacement limiter 192A and 192B also includes a second portion 198A and 198B, respectively that extends over a top surface 200 of load beam 140, as illustrated in FIGS. 2A and 2B. Second portion, generally referred to as 198, includes at least one extension 202 that engages top surface 200 of load beam 140 to limit the relative vertical displacement of head 118 from load beam 140. In accordance with one embodiment of the invention, limiter members 192A and 192B are T-shaped and second portion 198 includes two extension members 204 and 206.

In addition to limiting vertical displacement of head 118, such a configuration prevents excessive rolling of head 118 during a shock event and also reduces a likelihood of limiter member 192A or 192B disengaging from load beam 140.

Figure 6:
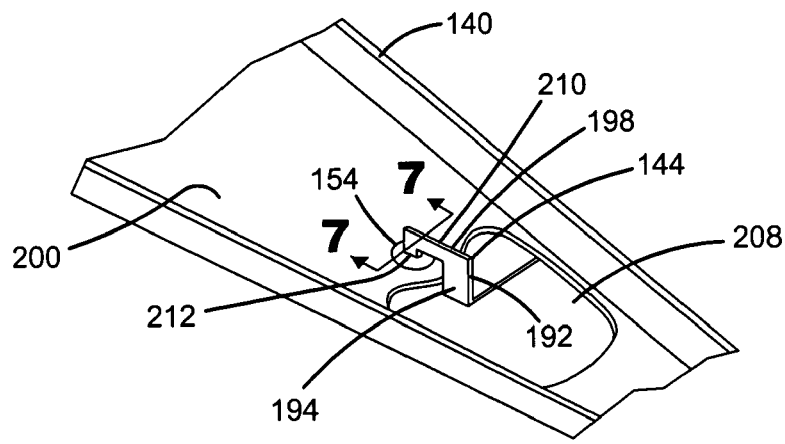
FIG. 6 is a perspective view of a displacement limiter and load beam in accordance with an embodiment of the invention.
Figure 7A:
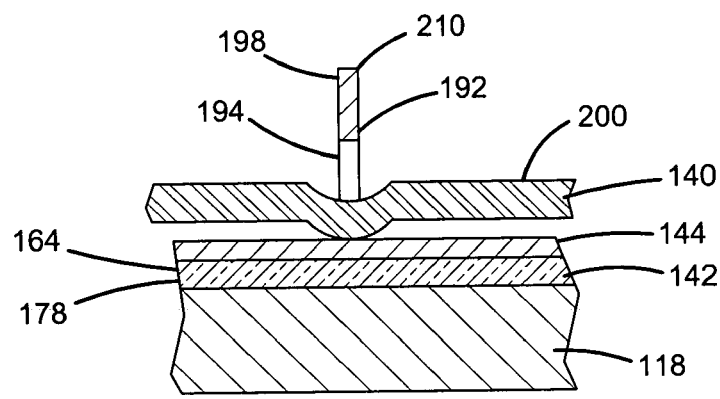
FIGS. 7A and 7B are cross-sectional views taken generally along line 7—7 of FIG. 6, but with a flex gimbal and a head present.
Figure 7B:
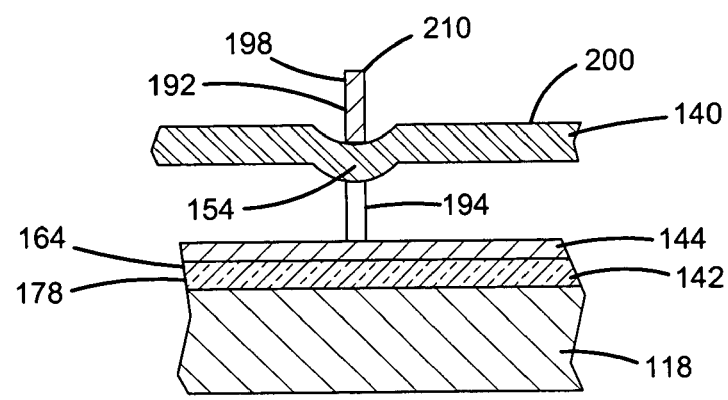

Limiter member 192 can also be L-shaped as shown in FIGS. 6, 7A and 7B. FIG. 6 is a perspective view of displacement limiter 144 and load beam 140. FIGS. 7A and 7B are cross-sectional views taken generally along line 7—7 of FIG. 6, but with flex gimbal 142 and head 118 present. FIG. 7A illustrates normal operation of suspension 116 where head mount portion 178 gimbals about dimple 154, and FIG. 7B illustrates the operation of displacement limiter 144 during a shock event which causes head 118 to be displaced vertically from load beam 140. In accordance with this embodiment of the invention, first portion 194 extends through aperture 208 of load beam 140. Second portion 198 of limiter member 192 includes a single extension 210. Second portion 198 can also include a downwardly extending portion 212 that is aligned with dimple 154 and is configured to engage top surface 200 of dimple 154 during a shock event to limit the displacement of head 118, as illustrated in FIG. 7B.

Figure 8:
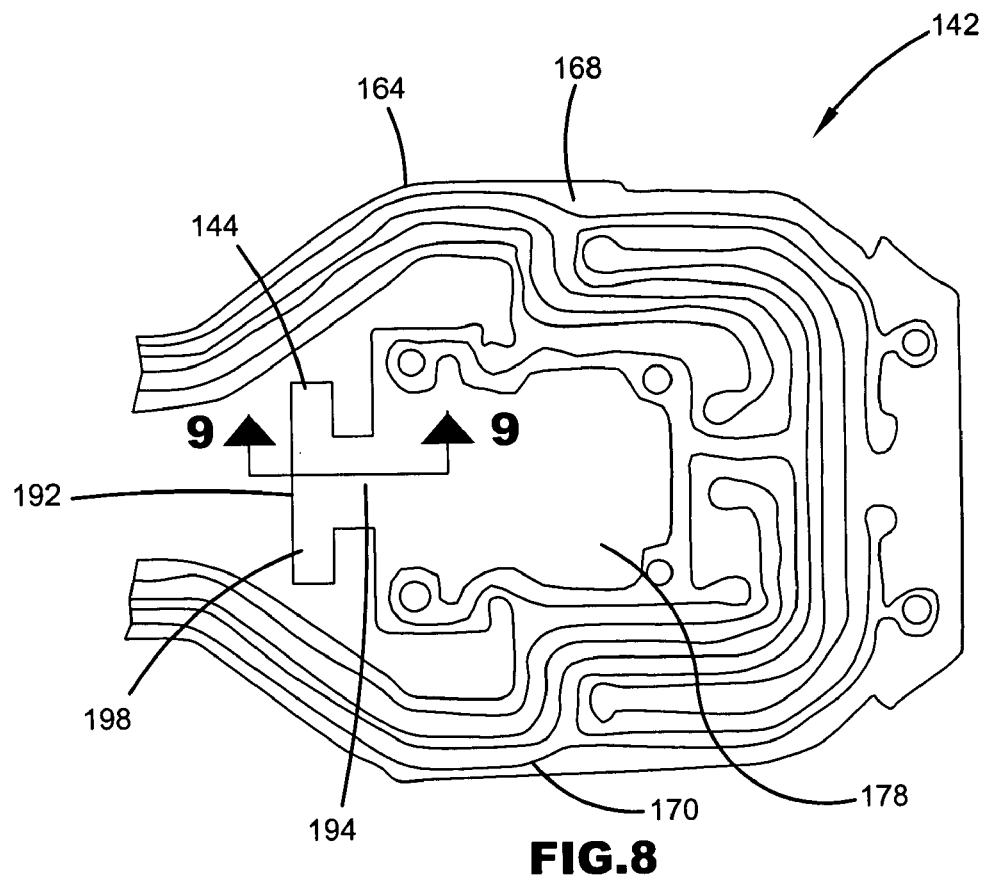
FIG. 8 is a partial bottom plan view of a flex gimbal and displacement limiter in accordance with an embodiment of the invention.
Figure 9:
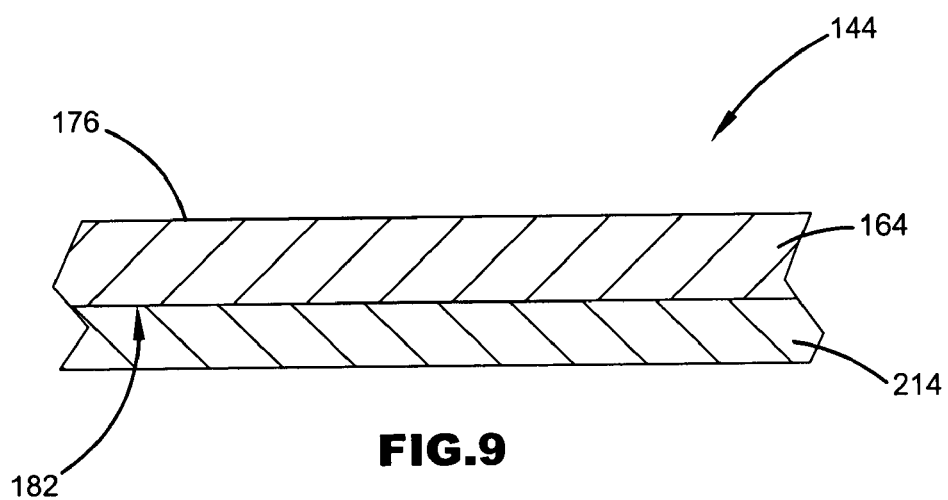
FIG. 9 is a cross-sectional view of the flex gimbal and displacement limiter of FIG. 8 taken generally along line 9—9.

In accordance with one embodiment of the invention, displacement limiter 144 is formed of metal, such as copper, that is attached to top side 182 of dielectric layer 164 at the head mount portion 178 using an adhesive or other suitable method as shown in FIGS. 5A and 5B. Another embodiment of displacement limiter 144 is formed by dielectric layer 164 of flex gimbal 142 as shown in the partial bottom plan view of FIG. 8. Additional support for the limiter member 192 formed by dielectric layer 164 can be provided by a metal ground layer 214 that is attached to a top side 182 of dielectric layer 164, as illustrated in FIG. 9, which is a cross-sectional view of FIG. 8 taken along line 9—9.

Many different methods can be implemented to manufacture suspension 116. In accordance with one embodiment of the invention, load beam 140, flex gimbal 142, and displacement limiter 144 described above are provided. A top side 182 of the dielectric layer 164 of the flex gimbal 142 is attached to a bottom side 183 of the load beam 140 and to a bottom side 216 of the displacement limiter, as illustrated in FIGS. 4 and 5A. Next, the first portion 194 of each limiter member 192 are extended through the corresponding apertures 160 or 162 of the load beam 140, as shown in FIGS. 2A and 2B. Finally, the second portion 198 of each limiter member 192 is positioned over a top surface 200 of the load beam 140. A head 118 can also be mounted to a head mount portion 178 of flex gimbal 142 either prior to the mounting of flex gimbal 142 to load beam 140 and displacement limiter 144, or following the formation of the suspension 116 as described above.

Figure 10A:
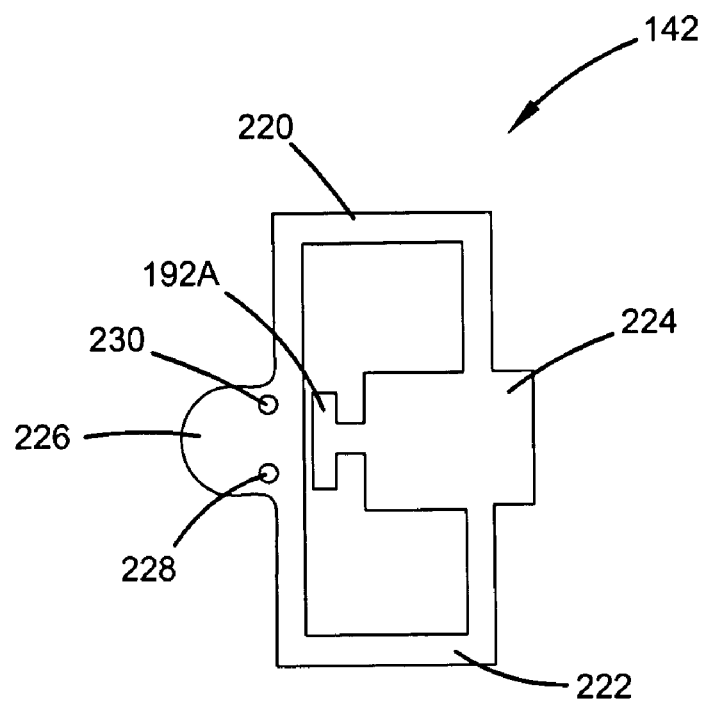
FIGS. 10A and 10B are top plan views of displacement limiters in accordance with embodiments of the invention.
Figure 10B:
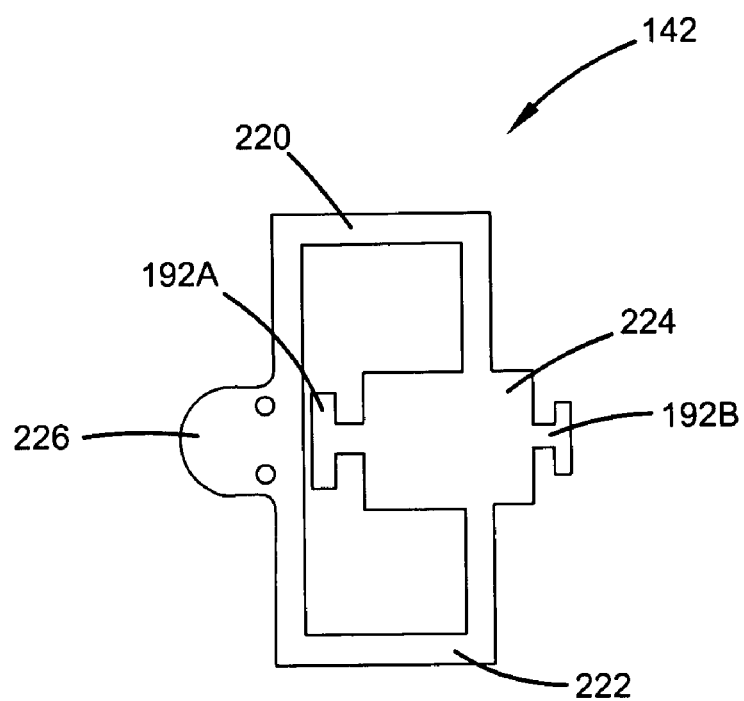
Figure 11:
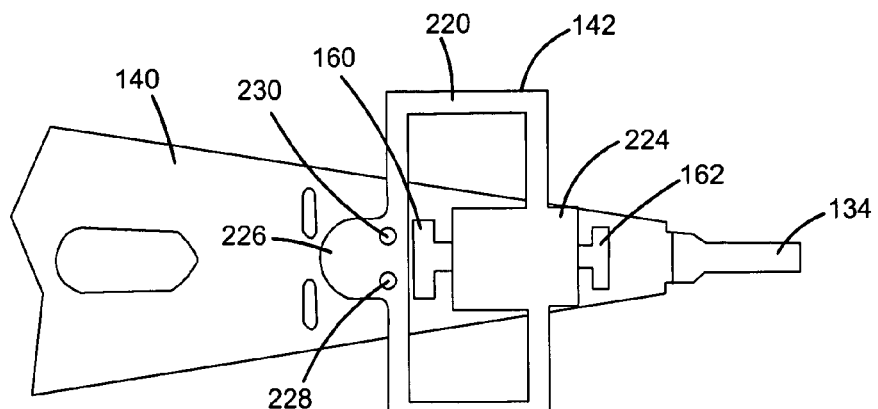
FIGS. 11–13 are bottom plan views of a suspension in accordance with embodiments of the invention during various stages of manufacture.

In accordance with one embodiment of the invention, displacement limiter 144 includes limiter tabs 220 and 222, as shown in FIGS. 10A and 10B respectively corresponding to single and dual limiter member embodiments of displacement limiter 42. Each limiter tab connects to a panel member 224, which is configured to mount to top side 182 of dielectric layer 164 at the head mount portion 178. Limiter tabs 220 and 222 are joined together at an attachment portion 226 that is configured for mounting to load beam 140 as illustrated in FIG. 11. Attachment portion 222 can include alignment apertures 228 and 230 that align with corresponding apertures 232 and 234 (FIG. 3A) of load beam 140 to ensure proper alignment of displacement limiter 144 with load beam 140. Limiter members 192 can then be bent to extend the first portions 194 through the corresponding apertures of load beam 140 and position the second portions 198 over the top surface 200 of the load beam 140. This embodiment of displacement limiter 144 simplifies the manufacture of suspension 116 by allowing displacement limiter 144 to be initially mounted to load beam 140 prior to the mounting of flex gimbal 142 to load beam 140 and displacement limiter 144.

Figure 12:
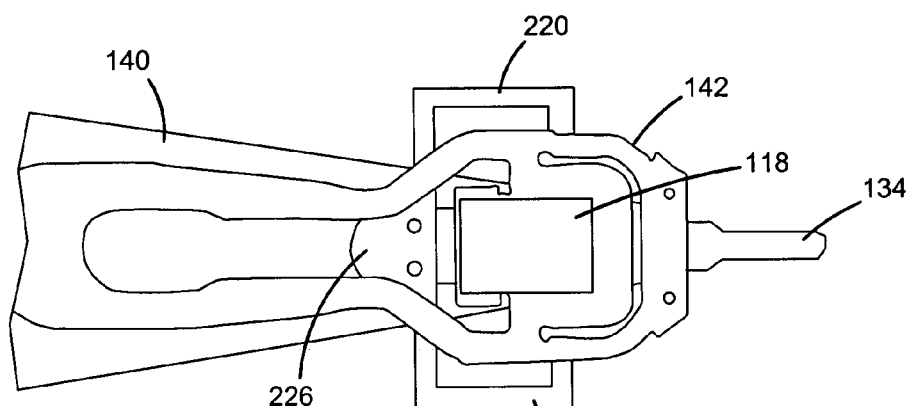
Figure 13:
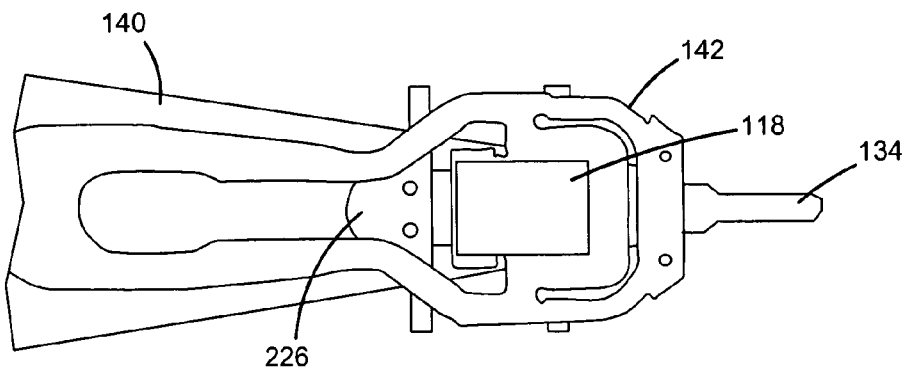

Next, as illustrated in FIG. 12, the top side 182 of the dielectric layer 164 of the flex gimbal 142 is attached to the bottom side 183 of the load beam 140 and a bottom side 216 of the displacement limiter. A head 118 can also be mounted to the head mount portion 128 of the flex gimbal 142 either prior to the mounting of the flex gimbal 142 to the load beam 140 and the displacement limiter 144 or sometime thereafter. Finally, as illustrated in FIG. 13, limiter tabs 220 and 222 are cut to free displacement limiter 144 from load beam 140.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the locations of the limiter members of the displacement limiter and the corresponding apertures of the load beam through which they extend can be changed while still maintaining substantially the same functionality and without departing from the scope and spirit of the present invention.

What is claimed is:

1. A suspension comprising:
   a load beam including a distal end having a dimple extending therefrom and an aperture;
   a gimbal having a base dielectric layer and at least two electrical conductors coupled to the dielectric layer, the dielectric layer having a top side contacting a bottom side of the load beam at a first location; and
   a displacement limiter attached to the top side of the dielectric layer and including a limiter member having a first portion extending through the aperture of the load beam and a second portion extending over a top surface of the load beam, wherein displacement of the gimbal relative to the load beam is limited by the second portion.

2. The suspension of claim 1 including a head having a top side coupled to a bottom side of the dielectric layer at a head mount portion.

3. The suspension of claim 1, wherein the gimbal includes a pair of elongate arms.

4. The suspension of claim 3, wherein the gimbal includes a head mount portion between the pair of elongate arms.

5. The suspension of claim 4, wherein the displacement limiter attaches to the top side of the dielectric layer at the head mount portion.

6. The suspension of claim 4 including a head having a top side coupled to a bottom side of the dielectric layer at the head mount portion.

7. The suspension of claim 1, wherein the gimbal is attached to the load beam at a second location.

8. The suspension of claim 7, wherein the first and second locations are on opposite sides of the dimple.

9. The suspension of claim 7, wherein the gimbal includes a pair of elongate arms extending alongside the dimple.

10. The suspension of claim 9, wherein the gimbal includes a transverse portion extending between the elongate arms and attached to the load beam at the second location.

11. The suspension of claim 1, wherein the dielectric layer is formed of a polyimide.

12. The suspension of claim 1, wherein:
    the gimbal includes a metal ground layer attached to the top side of a head mount portion of the dielectric layer; and
    the displacement limiter is formed by the dielectric layer and the metal ground layer of the gimbal.

13. The suspension of claim 1, wherein the dielectric layer forms the displacement limiter.

14. The suspension of claim 1, wherein the displacement limiter is formed of metal.

15. The suspension of claim 1, wherein the second portion is configured to contact the load beam at the dimple.

16. The suspension of claim 1, wherein the limiter member is L-shaped.

17. The suspension of claim 1, wherein the limiter member is T-shaped.

18. The suspension of claim 1, wherein the aperture of the load beam is either on a proximal side of the dimple or a distal side of the dimple.

19. A suspension comprising:
    a load beam including a distal end having a dimple extending therefrom and first and second apertures positioned on opposite sides of the dimple;
    a gimbal having a base dielectric layer and at least two electrical conductors coupled to the dielectric layer, the dielectric layer having a top side contacting a bottom side of the load beam at a first location; and
    a displacement limiter attached to the dielectric layer and including first and second limiter members, each having a first portion respectively extending through the first and second apertures of the load beam and a second portion extending over a top surface of the load beam, wherein displacement of the gimbal relative to the load beam is limited by the second portions of the first and second limiter members.

20. The suspension of claim 19, wherein the gimbal includes a pair of elongate arms and a head mount portion between the pair of elongate arms.

21. The suspension of claim 20, wherein the displacement limiter attaches to the dielectric layer at the head mount portion.

22. The suspension of claim 20 including a head having a top side coupled to a bottom side of the dielectric layer at the head mount portion.

23. The suspension of claim 19, wherein the gimbal is attached to the load beam at a second location.

24. The suspension of claim 23, wherein the first and second locations are on opposite sides of the dimple.

25. The suspension of claim 23 including a pair of elongate arms extending alongside the dimple.

26. The suspension of claim 25, wherein the gimbal includes a head mount portion between the elongate arms.

27. The suspension of claim 25, wherein the gimbal includes a transverse portion extending between the elongate arms and attached to load beam at the second location.

28. The suspension of claim 19, wherein:
    the gimbal includes a metal ground layer attached to the top side of a head mount portion of the dielectric layer; and
    the displacement limiter is formed by the dielectric layer and the metal ground layer of the gimbal.

29. The suspension of claim 19, wherein the dielectric layer forms the displacement limiter.

30. The suspension of claim 19, wherein the displacement limiter is formed of metal.

31. The suspension of claim 19, wherein the first or second limiter is either L-shaped or T-shaped.

32. The suspension of claim 19, wherein the first aperture of the load beam is on a proximal side of the dimple and the second aperture is on a distal side of the dimple.

33. A suspension comprising:
  a load beam including a distal end and an aperture;
  a flex gimbal attached to the load beam and comprising a base dielectric layer and a plurality of electrical conductors coupled to the dielectric layer; and
  a displacement limiter comprising a dielectric, a first portion extending through the aperture of the load beam, and a second portion extending over a top surface of the load beam, wherein displacement of the flex gimbal relative to the load beam is limited by the second portion.

34. The suspension of claim 33, wherein the base dielectric layer of the gimbal includes a top side contacting a bottom side of the load beam.

* * * * *